United States Patent
Wang et al.

(10) Patent No.: US 11,593,000 B2
(45) Date of Patent: Feb. 28, 2023

(54) DATA PROCESSING METHOD AND APPARATUS

(71) Applicant: HUAWEI TECHNOLOGIES CO., LTD., Shenzhen (CN)

(72) Inventors: Ning Wang, Shenzhen (CN); Xiyu Zhou, Shanghai (CN); Wei Du, Shanghai (CN); Xiang Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/262,310

(22) PCT Filed: Jul. 26, 2018

(86) PCT No.: PCT/CN2018/097293
§ 371 (c)(1),
(2) Date: Jan. 22, 2021

(87) PCT Pub. No.: WO2020/019267
PCT Pub. Date: Jan. 30, 2020

(65) Prior Publication Data
US 2021/0303181 A1      Sep. 30, 2021

(51) Int. Cl.
*G06F 3/06*      (2006.01)
(52) U.S. Cl.
CPC ............ *G06F 3/0622* (2013.01); *G06F 3/064* (2013.01); *G06F 3/0631* (2013.01); *G06F 3/0632* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 2011/0126045 A1* | 5/2011 | Bennett | G06F 11/108 714/6.22 |
| 2012/0084506 A1 | 4/2012 | Colgrove et al. | |
| 2016/0188211 A1 | 6/2016 | Song et al. | |
| 2018/0341577 A1* | 11/2018 | Shin | G06F 11/1048 |
| 2019/0196911 A1* | 6/2019 | Satoyama | G06F 11/1088 |

(Continued)

FOREIGN PATENT DOCUMENTS

| | | |
|---|---|---|
| CN | 103348326 A | 10/2013 |
| CN | 103488583 A | 1/2014 |

(Continued)

*Primary Examiner* — Stephanie Wu
(74) *Attorney, Agent, or Firm* — Rimon PC

(57) ABSTRACT

Embodiments relate to the field of storage technologies. The method is applied to a flash device whose first physical storage space stores a data block at a first security level and a data block at a second security level and whose second physical storage space stores a data block at a second security level. The method includes: receiving a data write request used to request to write target data, and obtaining a security level of the target data; and writing the target data into the first physical storage space if the security level of the target data is the first security level; or writing the target data into the second physical storage space or writing the target data into the second physical storage space and the first physical storage space if the security level of the target data is the second security level.

17 Claims, 9 Drawing Sheets

(56) References Cited

U.S. PATENT DOCUMENTS

2020/0004630 A1* 1/2020 Jaquette .............. G06F 11/1076
2020/0019323 A1* 1/2020 Zagade ................ G06F 3/0653

FOREIGN PATENT DOCUMENTS

| CN | 104267913 A | 1/2015 |
| --- | --- | --- |
| CN | 104657405 A | 5/2015 |
| CN | 105404469 A | 3/2016 |
| CN | 106845289 A | 6/2017 |
| CN | 112513804 A | 3/2021 |

* cited by examiner

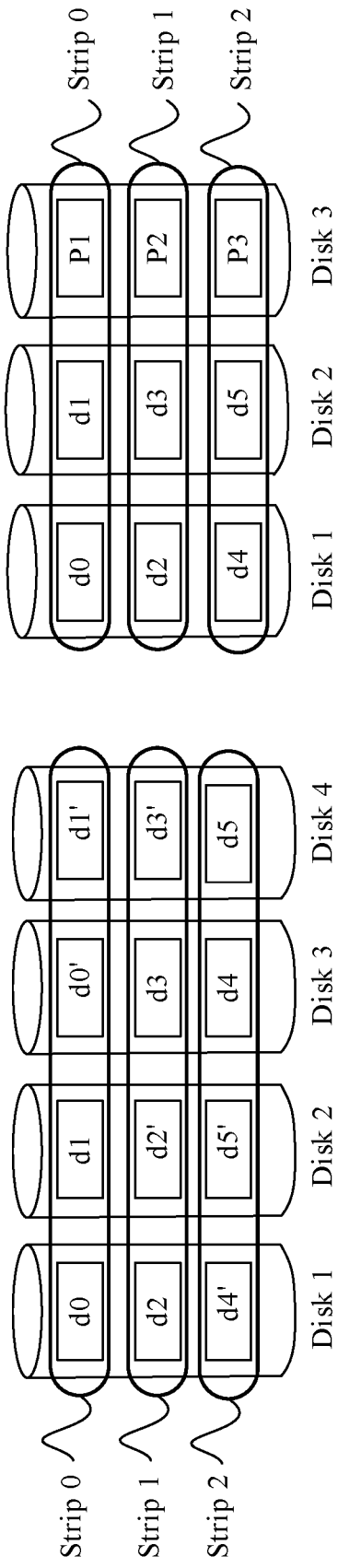
FIG. 1(A)
FIG. 1(B)
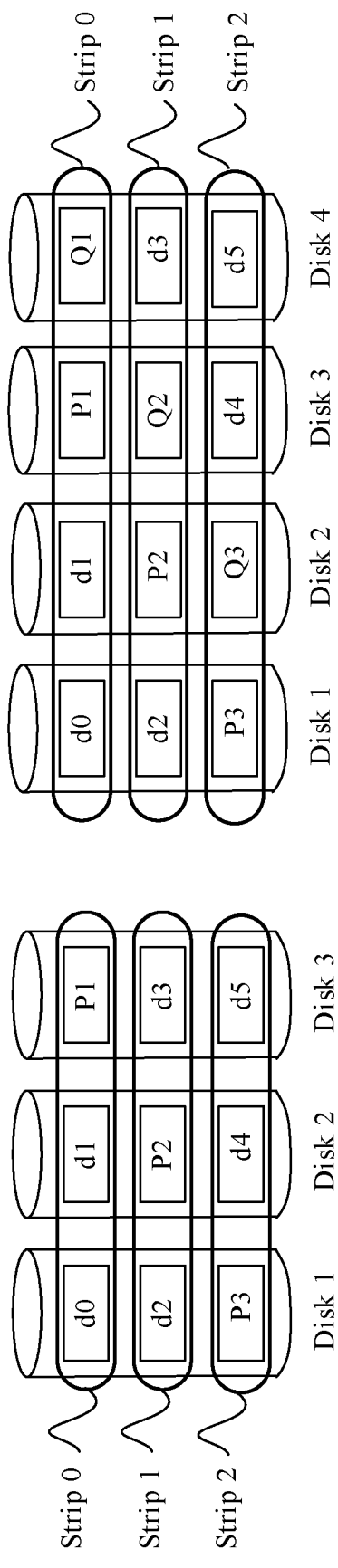
FIG. 1(C)
FIG. 1(D)

DATA PROCESSING METHOD AND APPARATUS

CROSS-REFERENCE TO RELATED APPLICATIONS

This application is a national stage of International Application No. PCT/CN2018/097293, filed on Jul. 26, 2018, which is hereby incorporated by reference in its entirety.

TECHNICAL FIELD

Embodiments of this application relate to the field of storage technologies, and in particular, to a data processing method and apparatus.

BACKGROUND

A redundant array of independent NAND (Redundant Array of Independent NAND, RAIN) is a technology in which one independent programmable unit, such as one independent programmable flash chip, a die or a plane (one die may include at least one plane), inside a flash device is compared to one independent physical disk and a plurality of independent programmable flash chips are combined into one array. In the foregoing array, data is stored in strips (Strip). In this way, data can be written into a plurality of independent programmable flash chips in parallel, thereby greatly increasing a write speed of user data, and providing storage redundancy to improve data reliability.

Currently, each strip includes one parity data group, the parity data group includes at least one piece of parity data, and parity data groups in different strips are located in different independent programmable flash chips. That is, for each strip, at least one independent programmable flash chip is required to store parity data in the strip. However, for a relatively small device, this storage manner causes high overheads and low effective-utilization of storage space.

SUMMARY

Embodiments of this application provide a data processing method and apparatus, to improve storage space utilization of a flash device.

To achieve the foregoing objective, the following technical solutions are used in the embodiments of this application:

According to a first aspect, a data processing method is provided. The data processing method is applied to a flash device whose non-volatile memory (Non Volatile Memory) includes x (x is an integer greater than or equal to 1) independent programmable flash chips. First physical storage space of the flash device is used to store a data block at a first security level and a data block at a second security level, and second physical storage space is used to store a data block at a second security level. Herein, the data block at the first security level includes x independent programmable flash chips in a preset customizable partial redundant array of independent NAND (Customizable Partial RAIN, CPR) form at a preset CPR level. The data block at the first security level includes at least one strip set, the strip set includes m (m is an integer greater than or equal to 2) adjacent strips and one parity data group, and parity data groups in different strip sets are located in different independent programmable flash chips. The preset CPR form is used to indicate that the m adjacent strips include one parity data group. The data block at the second security level is used to store user data only. The first security level is higher than the second security level. Specifically, the data processing method includes: receiving, by the flash device, a data write request used to request to write target data, and obtaining a security level of the target data based on the data write request. In this way, if the security level of the target data is the first security level, the flash device writes the target data into the first physical storage space; if the security level of the target data is the second security level, the flash device writes the target data into the second physical storage space, or writes the target data into the second physical storage space and the first physical storage space.

Because each strip set in the data block at the first security level includes m adjacent strips and each strip set includes one parity data group, that is, user data in the m adjacent strips shares the one parity data group, compared with the prior art in which each strip includes at least one piece of parity data, this method effectively reduces storage space occupied by parity data, and improves storage space utilization. The data block at the second security level is used to store user data only, that is, the data block at the second security level does not include parity data. Compared with the prior art, this method also improves storage space utilization to some extent.

In addition, the first security level is higher than the second security level, and each strip set in the data block at the first security level includes one parity data group. Existence of the parity data group effectively ensures data reliability. In this way, the flash device in this application dynamically allocates storage space to the target data based on the security level of the target data, so that reliability of the target data can be ensured, and storage space utilization can be effectively improved.

Optionally, in a possible implementation of this application, the data write request received by the flash device includes a first identifier used to indicate the security level of the target data.

In this application, the first identifier with different values is used to specifically indicate the security level of the target data.

Optionally, in another possible implementation of this application, if the value of the first identifier is a first preset value, the first identifier is specifically used to indicate that the security level of the target data is the first security level. Correspondingly, a method for the "writing, by the flash device, the target data into the first physical storage space if the security level of the target data is the first security level" includes: writing, by the flash device, the target data into an already allocated data block that is at the first security level in the first physical storage space and whose remaining storage space is larger than storage space required for storing the target data; or writing, by the flash device, the target data into a newly allocated data block at the first security level in the first physical storage space; or writing, by the flash device, the target data into an already allocated data block that is at the first security level in the first physical storage space and whose remaining storage space is smaller than storage space required for storing the target data, and into a newly allocated data block at the first security level in the first physical storage space.

It can be learned from the foregoing description that the first physical storage space may store both a data block at the first security level and a data block at the second security level, but the second physical storage space is used to store a data block at the second security level only. Therefore, when the security level of the target data is the first security level, the flash device writes the target data into a data block at the first security level in the first physical storage space. In actual use, the flash device writes the target data into a data block at the first security level based on actual usage of the storage space.

Optionally, in another possible implementation of this application, if the value of the first identifier is a second preset value, the first identifier is specifically used to indicate that the security level of the target data is the second security level. Correspondingly, a method for the "writing, by the flash device if the security level of the target data is the second security level, the target data into the second physical storage space, or writing the target data into the second physical storage space and the first physical storage space" includes: determining, by the flash device, a size of remaining storage space of the second physical storage space; and if the size of the remaining storage space of the second physical storage space is greater than a size of storage space required for storing the target data, writing, by the flash device, the target data into the second physical storage space; or if the size of the remaining storage space of the second physical storage space is greater than zero and less than a size of storage space required for storing the target data, writing, by the flash device, the target data into the remaining storage space of the second physical storage space and into a data block at the second security level in the first physical storage space; or if the size of the remaining storage space of the second physical storage space is equal to zero, writing, by the flash device, the target data into a data block at the second security level in the first physical storage space.

In a scenario in which the security level of the target data is the second security level, the flash device preferably writes the target data into the second physical storage space. When the remaining storage space of the second physical storage space is insufficient for storing the target data, the flash device writes the target data into the remaining storage space of the second physical storage space and into the first physical storage space.

Optionally, in another possible implementation of this application, the m adjacent strips belong to different physical pages, thereby avoiding a problem that data in different strips is simultaneously damaged, and improving a capability of restoring correct data by the flash device.

Optionally, in another possible implementation of this application, the flash device further receives a configuration command from a host. The configuration command includes a size of the first physical storage space, the CPR form, and the preset CPR level. In this way, the flash device responds to the configuration command to complete initial configuration.

The first physical storage space in this application is maximum storage space that is in the flash device and that is used to store a data block at the first security level. In actual application, a size of storage space required by the flash device to store data at the first security level may be less than the size of the first physical storage space.

According to a second aspect, a data processing method is provided, applied to a flash device whose non-volatile memory includes x (x is an integer greater than or equal to 1) independent programmable flash chips. After receiving a data write request including a first identifier used to indicate a security level of target data, the flash device dynamically allocates storage space to the target data based on the security level that is of the target data and that is indicated by the first identifier, and writes the target data into the allocated storage space.

Optionally, in a possible implementation of this application, first physical storage space of the flash device is used to store a data block at a first security level. The data block at the first security level includes x independent programmable flash chips in a preset customizable partial redundant array of independent NAND (CPR) form at a preset CPR level. The data block at the first security level includes at least one strip set, the strip set includes m (m is an integer greater than or equal to 2) adjacent strips, the strip set includes one parity data group, and parity data groups in different strip sets are located in different independent programmable flash chips. The preset CPR form is used to indicate that the m adjacent strips include one parity data group, where m is an integer greater than or equal to 2. If a value of the first identifier is a first preset value, the first identifier is used to indicate that the security level of the target data is the first security level. When the value of the first identifier is the first preset value, a method for the "dynamically allocating storage space to the target data based on the security level that is of the target data and that is indicated by the first identifier, and writing the target data into the allocated storage space" includes: writing, by the flash device, the target data into an already allocated data block that is at the first security level in the first physical storage space and whose remaining storage space is larger than storage space required for storing the target data; or writing, by the flash device, the target data into a newly allocated data block at the first security level in the first physical storage space; or writing, by the flash device, the target data into an already allocated data block that is at the first security level in the first physical storage space and whose remaining storage space is smaller than storage space required for storing the target data, and into a newly allocated data block at the first security level in the first physical storage space.

When the security level of the target data is the first security level, the flash device writes the target data into the data block at the first security level. Because each strip set in the data block at the first security level includes m adjacent strips and each strip set includes one parity data group, that is, user data in the m adjacent strips shares the one parity data group, compared with the prior art in which each strip includes at least one piece of parity data, this method effectively reduces storage space occupied by parity data, and improves storage space utilization.

In addition, each strip set in the data block at the first security level includes one parity data group, and existence of the parity data group effectively ensures data reliability. In this way, the flash device in this application dynamically allocates storage space to the target data based on the security level of the target data, so that reliability of the target data can be ensured, and storage space utilization can be effectively improved.

Optionally, in another possible implementation of this application, second physical storage space of the flash device is used to store a data block at a second security level, and the data block at the second security level is used to store user data only. In addition, the first physical storage space of the flash device is further used to store a data block at the second security level, and the second security level is lower than the first security level. If the value of the first identifier is a second preset value, the first identifier is used to indicate that the security level of the target data is the second security level. When the value of the first identifier is the second preset value, a method for the "dynamically allocating storage space to the target data based on the security level that is of the target data and that is indicated by the first identifier, and writing the target data into the allocated storage space" includes: determining, by the flash device, a size of remaining storage space of the second physical storage space; and if the size of the remaining storage space of the second physical storage space is greater than a size of storage space required for storing the target data, writing, by the flash device, the target data into the second physical storage space; or if the size of the remaining storage space of the second physical storage space is greater than zero and less than a size of storage space required for storing the target data, writing, by the flash device, the target data into the remaining storage space of the second physical storage space and into a data block at the second security level in the first physical storage space; or if the size of the remaining storage space of the second physical storage space is equal to zero, writing, by the flash device, the target data into a data block at the second security level in the first physical storage space.

The data block at the second security level is used to store user data only, that is, the data block at the second security level does not include parity data. Compared with the prior art, this method improves storage space utilization to some extent.

According to a third aspect, a data processing method is provided, applied to a terminal including a flash device. The flash device includes x (x is an integer greater than or equal to 1) independent programmable flash chips. Specifically, a processor of the terminal sends a data write request including a first identifier to the flash device. The data write request is used to request to write target data, and the first identifier is used to indicate a security level of the target data. After receiving the data write request, the flash device dynamically allocates storage space to the target data based on the security level that is of the target data and that is indicated by the first identifier, and writes the target data into the allocated storage space.

Optionally, in a possible implementation of this application, first physical storage space of the flash device is used to store a data block at a first security level. The data block at the first security level includes x independent programmable flash chips in a preset customizable partial redundant array of independent NAND (CPR) form at a preset CPR level. The data block at the first security level includes at least one strip set, the strip set includes m (m is an integer greater than or equal to 2) adjacent strips, the strip set includes one parity data group, and parity data groups in different strip sets are located in different independent programmable flash chips. The preset CPR form is used to indicate that the m adjacent strips include one parity data group, where m is an integer greater than or equal to 2. If a value of the first identifier is a first preset value, the first identifier is used to indicate that the security level of the target data is the first security level. When the value of the first identifier is the first preset value, a method for the "dynamically allocating, by the flash device, storage space to the target data based on the security level that is of the target data and that is indicated by the first identifier, and writing the target data into the allocated storage space" includes: writing, by the flash device, the target data into an already allocated data block that is at the first security level in the first physical storage space and whose remaining storage space is larger than storage space required for storing the target data; or writing, by the flash device, the target data into a newly allocated data block at the first security level in the first physical storage space; or writing, by the flash device, the target data into an already allocated data block that is at the first security level in the first physical storage space and whose remaining storage space is smaller than storage space required for storing the target data, and into a newly allocated data block at the first security level in the first physical storage space.

When the security level of the target data is the first security level, the flash device writes the target data into a data block at the first security level. Because each strip set in the data block at the first security level includes m adjacent strips and each strip set includes one parity data group, that is, user data in the m adjacent strips shares the one parity data group, compared with the prior art in which each strip includes at least one piece of parity data, this method effectively reduces storage space occupied by parity data, and improves storage space utilization.

In addition, each strip set in the data block at the first security level includes one parity data group, and existence of the parity data group effectively ensures data reliability. In this way, the flash device in this application dynamically allocates storage space to the target data based on the security level of the target data, so that reliability of the target data can be ensured, and storage space utilization can be effectively improved.

Optionally, in another possible implementation of this application, second physical storage space of the flash device is used to store a data block at a second security level, and the data block at the second security level is used to store user data only. In addition, the first physical storage space of the flash device is further used to store a data block at the second security level, and the second security level is lower than the first security level. If the value of the first identifier is a second preset value, the first identifier is used to indicate that the security level of the target data is the second security level. When the value of the first identifier is the second preset value, a method for the "dynamically allocating, by the flash device, storage space to the target data based on the security level that is of the target data and that is indicated by the first identifier, and writing the target data into the allocated storage space" includes: determining, by the flash device, a size of remaining storage space of the second physical storage space; and if the size of the remaining storage space of the second physical storage space is greater than a size of storage space required for storing the target data, writing, by the flash device, the target data into the second physical storage space; or if the size of the remaining storage space of the second physical storage space is greater than zero and less than a size of storage space required for storing the target data, writing, by the flash device, the target data into the remaining storage space of the second physical storage space and into a data block at the second security level in the first physical storage space; or if the size of the remaining storage space of the second physical storage space is equal to zero, writing, by the flash device, the target data into a data block at the second security level in the first physical storage space.

The data block at the second security level is used to store user data only, that is, the data block at the second security level does not include parity data. Compared with the prior art, this method improves storage space utilization to some extent.

Optionally, in another possible implementation of this application, the processor may further send a configuration command to the flash device. The configuration command includes a size of the first physical storage space, the CPR form, and a manner of the preset CPR level. Correspondingly, after receiving the configuration command, the flash device completes initial configuration of the first physical storage space according to the configuration command.

Optionally, in another possible implementation of this application, the processor may further dynamically allocate available storage space of the first physical storage space to each of at least one application of the terminal. In this way, each application can occupy a specific part of the first physical storage space, thereby effectively balancing storage resource usage of all the applications.

According to a fourth aspect, a flash device is provided. The flash device includes a storage module, a communications module, and a processing module. Specifically, the storage module includes x independent programmable flash chips. First physical storage space in the storage module is used to store a data block at a first security level and a data block at a second security level. The data block at the first security level includes x independent programmable flash chips in a preset customizable partial redundant array of independent NAND (CPR) form at a preset CPR level. The data block at the first security level includes at least one strip set, the strip set includes m adjacent strips, the strip set includes one parity data group, and parity data groups in different strip sets are located in different independent programmable flash chips. The preset CPR form is used to indicate that the m adjacent strips include one parity data group. The data block at the second security level is used to store user data only. Second physical storage space in the storage module is used to store a data block at the second security level. The first security level is higher than the second security level. Herein, x is an integer greater than or equal to 1, and m is an integer greater than or equal to 2. The communications module is configured to receive a data write request. The data write request is used to request to write target data. The processing module is configured to: obtain a security level of the target data based on the data write request received by the communications module, write the target data into the first physical storage space of the storage module if the security level of the target data is the first security level, and write the target data into the second physical storage space of the storage module if the security level of the target data is the second security level, or write the target data into the second physical storage space and the first physical storage space of the storage module.

Optionally, in a possible implementation of this application, the data write request includes a first identifier used to indicate the security level of the target data.

Optionally, in another possible implementation of this application, if a value of the first identifier is a first preset value, the first identifier is specifically used to indicate that the security level of the target data is the first security level. When the security level of the target data is the first security level, the processing module is specifically configured to: write the target data into an already allocated data block that is at the first security level in the first physical storage space and whose remaining storage space is larger than storage space required for storing the target data; or write the target data into a newly allocated data block at the first security level in the first physical storage space; or write the target data into an already allocated data block that is at the first security level in the first physical storage space and whose remaining storage space is smaller than storage space required for storing the target data, and into a newly allocated data block at the first security level in the first physical storage space.

Optionally, in another possible implementation of this application, if the value of the first identifier is a second preset value, the first identifier is specifically used to indicate that the security level of the target data is the second security level. If the security level of the target data is the second security level, the processing module is specifically configured to: determine a size of remaining storage space of the second physical storage space; and if the size of the remaining storage space of the second physical storage space is greater than a size of storage space required for storing the target data, write the target data into the second physical storage space; or if the size of the remaining storage space of the second physical storage space is greater than zero and less than a size of storage space required for storing the target data, write the target data into the remaining storage space of the second physical storage space and into a data block at the second security level in the first physical storage space; or if the size of the remaining storage space of the second physical storage space is equal to zero, write the target data into a data block at the second security level in the first physical storage space Optionally, in another possible implementation of this application, the m adjacent strips belong to different physical pages.

Optionally, in another possible implementation of this application, the communications module is further configured to receive a configuration command from a host. The configuration command includes a size of the first physical storage space, the CPR form, and the preset CPR level. The processing module is further configured to complete initial configuration in response to the configuration command received by the communications module.

According to a fifth aspect, a flash device is provided. The flash device includes a storage module, a communications module, and a processing module. Specifically, the storage module includes x independent programmable flash chips, where x is an integer greater than or equal to 1. The communications module is configured to receive a data write request including a first identifier. The data write request is used to request to write target data, and the first identifier is used to indicate a security level of the target data. The processing module is configured to: dynamically allocate storage space to the target data based on the security level that is of the target data and that is indicated by the first identifier in the data write request received by the communications module, and write the target data into the allocated storage space.

Optionally, in a possible implementation of this application, first physical storage space of the storage module is used to store a data block at a first security level. The data block at the first security level includes x independent programmable flash chips in a preset CPR form at a preset CPR level. The data block at the first security level includes at least one strip set, the strip set includes m adjacent strips, the strip set includes one parity data group, and parity data groups in different strip sets are located in different independent programmable flash chips. The preset CPR form is used to indicate that the m adjacent strips include one parity data group, where m is an integer greater than or equal to 2. If a value of the first identifier is a first preset value, the first identifier is used to indicate that the security level of the target data is the first security level. When the value of the first identifier is the first preset value, the processing module is specifically configured to: write the target data into an already allocated data block that is at the first security level in the first physical storage space and whose remaining storage space is larger than storage space required for storing the target data; or write the target data into a newly allocated data block at the first security level in the first physical storage space; or write the target data into an already allocated data block that is at the first security level in the first physical storage space and whose remaining storage space is smaller than storage space required for storing the target data, and into a newly allocated data block at the first security level in the first physical storage space.

Optionally, in another possible implementation of this application, second physical storage space of the flash device is used to store a data block at a second security level. The data block at the second security level is used to store user data only, the first physical storage space is further used to store a data block at the second security level, and the second security level is lower than the first security level. If the value of the first identifier is a second preset value, the first identifier is used to indicate that the security level of the target data is the second security level. If the value of the first identifier is the second preset value, the processing module is specifically configured to: determine a size of remaining storage space of the second physical storage space; and if the size of the remaining storage space of the second physical storage space is greater than a size of storage space required for storing the target data, write the target data into the second physical storage space; or if the size of the remaining storage space of the second physical storage space is greater than zero and less than a size of storage space required for storing the target data, write the target data into the remaining storage space of the second physical storage space and into a data block at the second security level in the first physical storage space; or if the size of the remaining storage space of the second physical storage space is equal to zero, write the target data into a data block at the second security level in the first physical storage space According to a sixth aspect, a flash device is provided. The flash device includes one or more processors, a non-volatile memory, and a communications interface. The non-volatile memory and the communications interface are connected to the one or more processors. The flash device communicates with another device through the communications interface. The non-volatile memory is configured to store computer program code. The computer program code comprises an instruction. When the one or more processors execute the instruction, the flash device performs the data processing method in the first aspect, the second aspect, and the possible implementations of the first aspect and the second aspect.

According to a seventh aspect, a computer-readable storage medium is further provided. The computer-readable storage medium stores an instruction. When the instruction runs on the flash device in the fourth aspect or the fifth aspect, the flash device is enabled to perform the data processing method in the first aspect, the second aspect, and the possible implementations of the first aspect and the second aspect.

According to an eighth aspect, a computer program product including an instruction is further provided. When the instruction runs on the flash device in the fourth aspect or the fifth aspect, the flash device is enabled to perform the data processing method in the first aspect, the second aspect, and the possible implementations of the first aspect and the second aspect In this application, the names of the flash device constitute no limitation on devices or function modules. In actual implementation, the devices or the function modules may have other names. Provided that functions of the devices or function modules are similar to those in this application, the devices or function modules fall within the scope of the claims of this application and equivalent technologies thereof.

For specific descriptions of the fourth aspect, the fifth aspect, the sixth aspect, the seventh aspect, the eighth aspect, and the implementations thereof in this application, refer to the detailed descriptions of the first aspect, the second aspect, and the implementations thereof. In addition, for beneficial effects of the fourth aspect, the fifth aspect, the sixth aspect, the seventh aspect, the eighth aspect, and the implementations thereof, refer to the beneficial effect analysis in the first aspect, the second aspect, and the implementations thereof. Details are not described herein again.

According to a ninth aspect, a terminal is provided. The terminal includes a processor and the flash device in the fourth aspect, the fifth aspect, and the possible implementations thereof. The processor is configured to send a data write request including a first identifier to the flash device, so that the flash device dynamically allocates storage space to target data based on a security level that is of the target data and that is indicated by the first identifier. Herein, the data write request is used to request to write the target data.

Optionally, in a possible implementation of this application, the processor is further configured to send a configuration command to the flash device, so that the flash device completes initial configuration of first physical storage space in the flash device according to the configuration command. The configuration command includes a size of the first physical storage space, a preset CPR form, and a manner of a preset CPR level.

Optionally, in another possible implementation of this application, the processor may be further configured to dynamically allocate available storage space of the first physical storage space to each of at least one application of the terminal.

According to a tenth aspect, a computer-readable storage medium is further provided. The computer-readable storage medium stores an instruction. When the instruction runs on the terminal in the ninth aspect, the terminal is enabled to perform the data processing method in the third aspect and the possible implementations of the third aspect.

According to an eleventh aspect, a computer program product including an instruction is further provided. When the instruction runs on the terminal in the ninth aspect, the terminal is enabled to perform the data processing method in the third aspect and the possible implementations of the third aspect.

In this application, the names of the terminal constitute no limitation on devices or function modules. In actual implementation, the devices or the function modules may have other names. Provided that functions of the devices or function modules are similar to those in this application, the devices or function modules fall within the scope of the claims of this application and equivalent technologies thereof.

For specific descriptions of the ninth aspect, the tenth aspect, and the eleventh aspect of this application, and the implementations thereof, refer to the detailed descriptions of the third aspect and the implementations of the third aspect. In addition, for beneficial effects of the ninth aspect, the tenth aspect, the eleventh aspect, and the implementations thereof, refer to the beneficial effect analysis of the third aspect and the implementations of the third aspect. Details are not described herein again.

BRIEF DESCRIPTION OF DRAWINGS

FIG. 1(A) to FIG. 1(D) are schematic diagrams of data structures of RAIDs at different levels according to an embodiment of this application;

DESCRIPTION OF EMBODIMENTS

Figure 2:
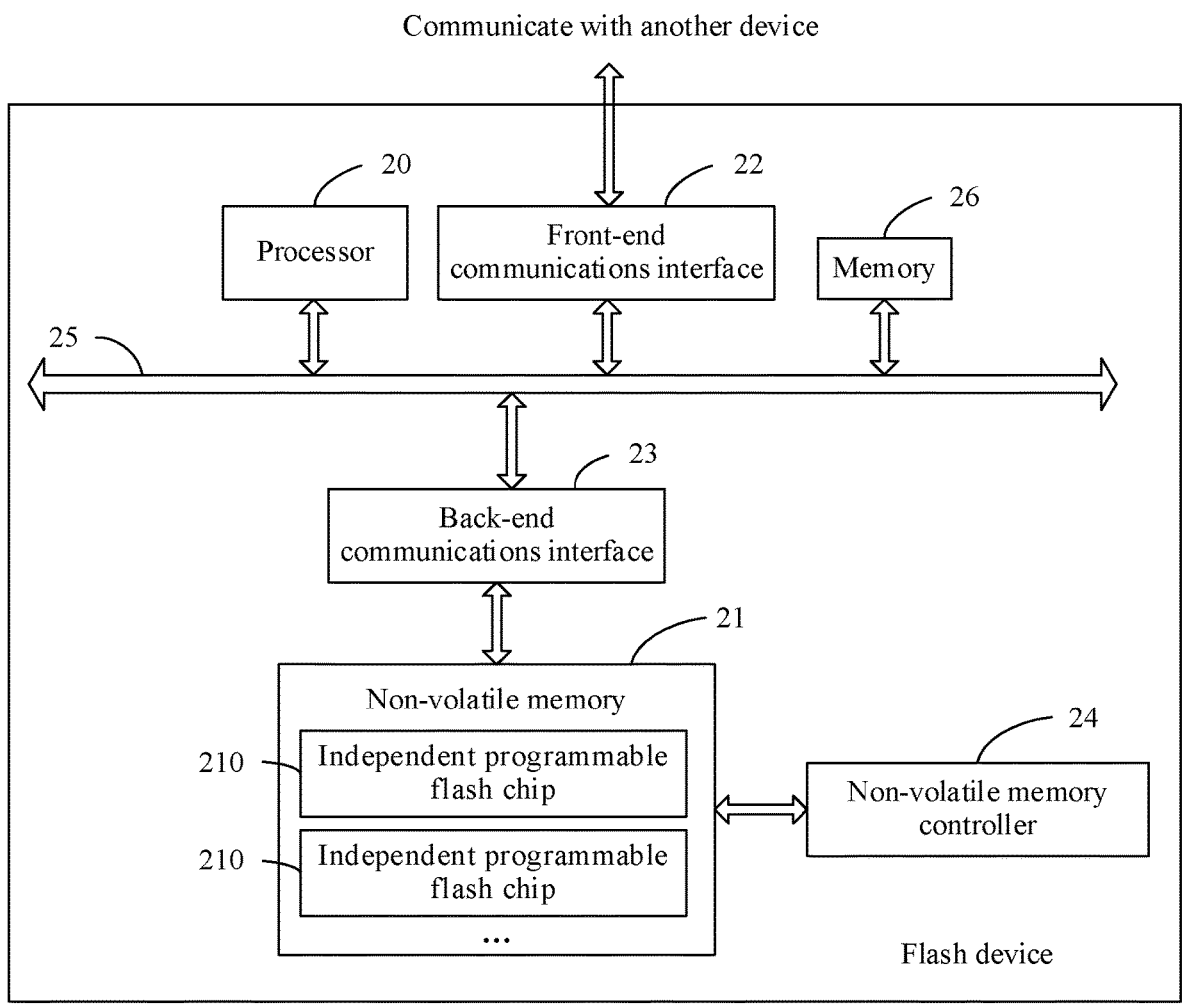
FIG. 2 is a schematic diagram of a hardware structure of a flash device according to an embodiment of this application.

In the specification, claims, and accompanying drawings of this application, the terms "first", "second", "third" and the like are intended to distinguish between different objects but do not limit a particular order.

In addition, in the embodiments of this application, the expression "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the expression "for example" or "example" or the like is intended to present a relative concept in a specific manner.

A flash (NAND Flash) is one of most widely used storage media at present, and has characteristics beyond comparison with traditional media in many fields, for example, high data storage speed, low noise, energy saving, shockproof, and a small size.

To improve data reliability, a redundant array of independent disks (Redundant Array of Independent disks, RAID) technology is proposed.

The RAID is a disk array combining a plurality of independent physical disks (disk), and can provide a user host with higher storage performance than a single disk and with a data backup function. A combination manner of the plurality of independent physical disks may be identified by using a RAID level.

Development of the RAID technology currently brings six standard RAID levels: RAID 0 to RAID 5. In addition, RAID 6, RAID 7, RAID 10 (a combination of RAID 1 and RAID 0), and RAID 01 (a combination of RAID 0 and RAID 1) are available. Different RAID levels represent different storage performance, data security, and storage costs.

As a data striping technology that requires at least two physical disks only, RAID 0 is cost-effective and can improve performance and throughput of the entire disk. However, RAID 0 does not provide redundancy or error recovery capabilities.

RAID 1 is a mirrored disk array. According to a principle of RAID 1, a position of data on one physical disk is directed to the same location on another physical disk, and all the data written to the physical disk by a user can be automatically copied to the another physical disk. In this way, data on a pair of physical disks is backed up for each other. When an original disk is busy, data can be directly read from a mirrored disk. When the original disk fails, data can be automatically read from or written to the mirrored disk without reassembling the invalid data. This feature ensures data security without service interruption, maximizing data availability and recoverability.

For example, a RAID 1 array including four physical disks (a disk 1, a disk 2, a disk 3, and a disk 4) is used. FIG. 1(A) shows distribution of data in the array. In FIG. 1(A), d0, d1, d2, d3, d4, and d5 represent user data, d0' is backup data of d0, d1' is backup data of d1, d2' is backup data of d2, d3' is backup data of d3, d4' is backup data of d4, and d5' is backup data of d5.

RAID 4 is an independent disk structure with a parity code, and has an independent parity disk, which is used to store parity data only, not user data. User data at the same level on different physical disks is checked by using exclusive OR (XOR). Parity data obtained after check is stored on the parity disk. When a physical disk is faulty, data can be restored based on data on other disks, ensuring data security.

For example, a RAID 4 array including three physical disks (a disk 1, a disk 2, and a disk 3) is used. FIG. 1(B) shows distribution of data in the array. In FIG. 1(B), the disk 3 is a parity disk, d0, d1, d2, d3, d4, and d5 represent user data, P1 is parity data of d0 and d1, P2 is parity data of d2 and d3, and P3 is parity data of d4 and d5.

RAID 5 is an independent disk structure with distributed parity. Different from RAID 4, RAID 5 stores parity data on different physical disks. When a physical disk is faulty, RAID 5 can restore data based on data on other disks.

For example, a RAID 5 array including three physical disks (a disk 1, a disk 2, and a disk 3) is used. FIG. 1(C) shows distribution of data in the array. In FIG. 1(C), d0, d1, d2, d3, d4, and d5 represent user data, P1 is parity data of d0 and d1, P2 is parity data of d2 and d3, and P3 is parity data of d4 and d5.

RAID 6 is an independent disk structure with two types of parity codes that are stored in a distributed manner. Compared with RAID 5, RAID 6 has an extra parity bit (Q). RAID 6 can restore data from any two concurrent disk failures in the disk array.

For example, a RAID 6 array including four physical disks (a disk 1, a disk 2, a disk 3, and a disk 4) is used. FIG. 1(D) shows distribution of data in the array. In FIG. 1(D), d0, d1, d2, d3, d4, and d5 represent user data, P1 and Q1 are parity data of d0 and d1, P2 and Q2 are parity data of d2 and d3, and P3 and Q3 are parity data of d4 and d5.

It should be noted that, although FIG. 1(A) and FIG. 1(D) each show four disks and FIG. 1(B) and FIG. 1(C) each show three disks, more or fewer disks can be included based on different RAID versions in another implementation manner.

An operating system can regard a disk array as a single logical storage unit or disk. By dividing a disk array into a plurality of strips (Strip), data can be distributed on a plurality of disks, thereby achieving low latency and high bandwidth. In addition, data can be restored to some extent after some disks are damaged.

FIG. 1(A), FIG. 1(B), FIG. 1(C), and FIG. 1(D) each include a strip 0, a strip 1, and a strip 2, and each strip includes at least one piece of parity data.

In actual application, a quantity of strips is not limited in different RAIDs.

It can be learned from the foregoing description that the RAID technology requires a combination of a plurality of physical disks. For small devices, such as smartphones, tablets, and netbooks, the RAID technology cannot fully play its role.

To resolve this problem, a redundant array of independent NAND (Redundant Array of Independent NAND, RAIN) technology is developed later.

The RAIN technology is a RAID-like technology in which one independent programmable unit, such as one independent programmable flash chip—a die or a plane (one die may include at least one plane), inside a flash device is compared to one independent physical disk and a plurality of independent programmable flash chips are combined into one array. Common RAIN technologies include technologies similar to RAID 4, RAID 5, and the like.

Similar to FIG. 1(B), in a technology similar to RAID 4, one independent programmable flash chip is specially configured to store parity data. Similar to FIG. 1(C), parity data in a technology similar to RAID 5 is stored in different independent programmable flash chips.

Generally, if the independent programmable flash chip is a die, due to factors such as a size, a mobile device usually includes a relatively small quantity of dies. Typically, a mobile device includes four or eight dies. For each strip, at least one die needs to be used to store parity data, thereby causing high overheads and low effective-utilization of storage space.

In addition, in the prior art, a piece of storage space in a flash device may be configured as a single-level cell (Single-Level Cell, SLC). Because the SLC has a large quantity of erase and write times, high reliability, and high read/write performance, when some data requires high performance or reliability, the data can be written to the storage space configured as an SLC. However, the SLC consumes a large amount of space.

In conclusion, for a relatively small device, the prior art cannot provide a method that can both reduce spatial overheads and improve data reliability.

To resolve this problem, this application provides a data processing method. The data processing method is applied to a flash device including x (x is an integer greater than or equal to 1) independent programmable flash chips. First physical storage space of the flash device is used to store a data block at a first security level and a data block at a second security level. The data block at the first security level includes x independent programmable flash chips in a preset CPR form at a preset CPR level. The data block at the first security level includes at least one strip set, the strip set includes m (m is an integer greater than or equal to 2) adjacent strips, the strip set includes one parity data group, and parity data groups in different strip sets are located in different independent programmable flash chips. The data block at the second security level is used to store user data only. Second physical storage space of the flash device is used to store a data block at the second security level, and the first security level is higher than the second security level.

Specifically, after receiving a data write request that is used to request to write target data and that includes a first identifier used to indicate a security level of the target data, the flash device dynamically allocates storage space to the target data based on the security level that is of the target data and that is indicated by the first identifier, and writes the target data into the allocated storage space. Because each strip set in the data block at the first security level includes m adjacent strips and each strip set includes one parity data group, that is, user data in the m adjacent strips shares the one parity data group, compared with the prior art in which each strip includes at least one piece of parity data, this method effectively reduces storage space occupied by parity data, and improves storage space utilization. The data block at the second security level is used to store user data only, that is, the data block at the second security level does not include parity data. Compared with the prior art, this method also improves storage space utilization to some extent.

In addition, the first security level is higher than the second security level, and each strip set in the data block at the first security level includes one parity data group. Existence of the parity data group effectively ensures data reliability. In this way, the flash device in this application dynamically allocates storage space to the target data based on the security level of the target data, so that reliability of the target data can be ensured, and storage space utilization can be effectively improved.

The independent programmable flash chip that constitutes the flash device may be a die or a plane. This is not specifically limited in this embodiment of this application.

FIG. 2 shows a hardware structure of a flash device according to an embodiment of this application. As shown in FIG. 2, the flash device in this embodiment of this application includes a processor 20, a non-volatile memory (Non Volatile Memory) 21, a front-end communications interface 22, a back-end communications interface 23, a non-volatile memory controller 24, a system bus 25, and a memory 26. The processor 20, the non-volatile memory 21, the front-end communications interface 22, the back-end communications interface 23, the non-volatile memory controller 24, and the memory 26 are connected by using the system bus 25.

The processor 20 is a control center of the flash device, and is connected to each part of the flash device by using various interfaces and lines. The processor 20 may be a central processing unit (Central Processing Unit, CPU), or may be one or more integrated circuits configured to implement the embodiments of this application. For example, the processor 20 includes at least one CPU, and each CPU may be a single-core processor (Single-core processor), or may be a multi-core processor (Multi-core processor).

The non-volatile memory 21 includes x (x is an integer greater than or equal to 1) independent programmable flash chips 210. Storage space of the x independent programmable flash chips 210 includes first physical storage space and second physical storage space. The first physical storage space is maximum storage space that is initially configured by the flash device and that is used to store data at a first security level. In the first physical storage space, the flash device may store a data block at the first security level and a data block at a second security level. The second physical storage space is used to store a data block at the second security level, and the first security level is higher than the second security level.

The first physical storage space is used to store a data block at the first security level and a data block at the second security level, the second physical storage space is used to store a data block at the second security level, and the first security level is higher than the second security level.

The data block at the first security level includes x independent programmable flash chips in a preset CPR form at a preset CPR level. The data block at the first security level includes at least one strip set, each strip set includes m (m is an integer greater than or equal to 2) adjacent strips, each strip set includes one parity data group, and parity data groups in different strip sets are located in different independent programmable flash chips. The parity data in the parity data group is used for restoration from faulty data. The preset CPR level in this embodiment of this application is similar to the foregoing RAID level, and the preset CPR level may be a CPR 4, a CPR 5, or a CPR 6. When the preset CPR level is a CPR 6, the parity data group includes two pieces of parity data. When the preset CPR level is a CPR 4 or a CPR 5, the parity data group includes one piece of parity data. The preset CPR form is used to indicate that the m adjacent strips include one parity data group.

Each strip set in the data block at the first security level includes one parity data group, that is, user data in the m adjacent strips shares the one parity data group. Compared with the prior art in which each strip includes at least one piece of parity data, this method effectively reduces storage space occupied by parity data, and improves storage space utilization.

Optionally, the m adjacent strips belong to different physical pages, thereby avoiding a problem that user data in different strips is simultaneously damaged, and improving a capability of restoring correct data by the flash device.

The data block at the second security level does not include a parity data group, and is used to store user data only. Compared with the prior art in which each strip includes at least one piece of parity data, this method effectively improves storage space utilization.

A size of the first physical storage space, the preset CPR form, and the preset CPR level are all configured by the flash device based on configuration information sent by a host. In actual application, the flash device allocates a data block at the first security level or a data block at the second security level in the first physical storage space based on a requirement, to store data. Distribution of the data block at the first security level and the data block at the second security level in the first physical storage space is not specifically limited in this embodiment of this application.

Figure 3:
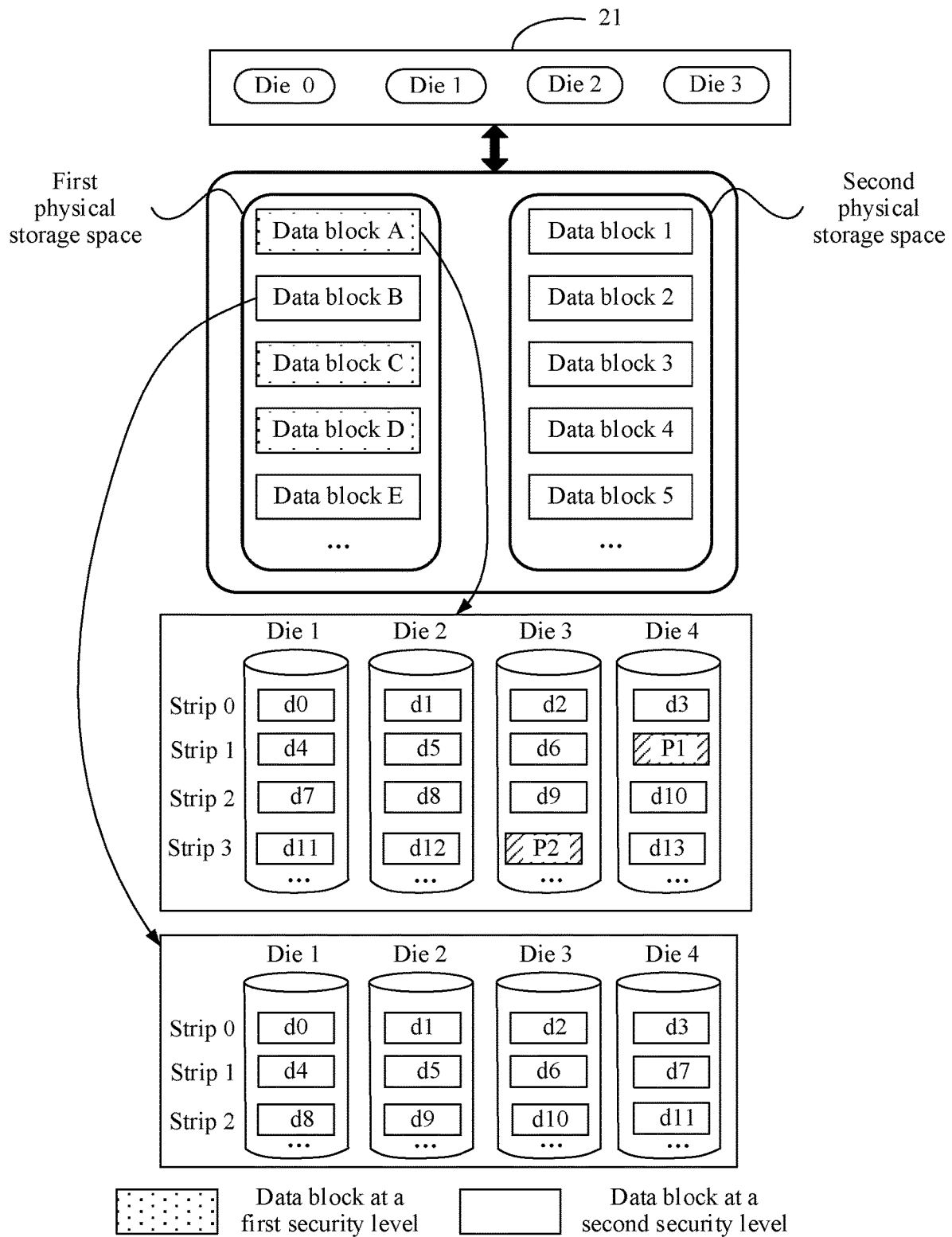
FIG. 3 is a schematic structural diagram of a non-volatile memory according to an embodiment of this application.

For example, FIG. 3 is a schematic structural diagram of the non-volatile memory 21. In FIG. 3, the non-volatile memory 21 includes four dies (a die 0, a die 1, a die 2, and a die 3), and a data block A includes the four dies in a CPR 8x and CPR 5 manner. The CPR 8x is used to indicate that two adjacent strips include one parity data group. That is, a strip 0 and a strip 1 include one parity data group, a strip 2 and a strip 3 include one parity data group, and so on. The preset CPR level is a CPR 5, indicating that the parity data group includes one piece of parity data. In FIG. 3, d0 to d13 represent user data, a parity data group of a strip 0 and a strip 1 is P1, a parity data group of a strip 2 and a strip 3 is P2, and P1 and P2 are located in different dies.

FIG. 1(C) indicates a structure of data that is distributed at a RAID 5 level. FIG. 3 indicates a structure of data that is distributed at a CPR 5 level. It can be learned from FIG. 1(C) and FIG. 3 that a quantity of parity data in the flash device in this application is relatively small, thereby effectively improving storage space utilization.

The front-end communications interface 22 is configured for communication between the flash device and another device, for example, communication between the flash device and a host. For example, the front-end communications interface 22 may be a non-volatile memory host controller interface specification (Non-Volatile Memory express, NVMe), a serial advanced technology attachment (Serial Advanced Technology Attachment, SATA), a universal flash storage (Universal Flash Storage, UFS), or the like. This is not specifically limited in this embodiment of this application.

The back-end communications interface 23 is configured to communicate with the non-volatile memory 21.

The non-volatile memory controller 24 is configured to control writing data into the non-volatile memory 21. The non-volatile memory controller 24 may be an independent processor with a single function.

For ease of representation, only one thick line is used to represent the bus 25 in FIG. 2, but this does not mean that there is only one bus or only one type of bus.

The memory 26 is configured to temporarily store operational data of the processor 20 and data exchanged with the non-volatile memory 21. The memory 26 may be a random access memory (Random Access Memory, RAM), a read-only memory (Read-Only Memory, ROM), or a cache (Cache). This is not specifically limited in this embodiment of this application.

It should be noted that the flash device may also be understood as a storage system including a plurality of storage devices. In this case, each storage device in the storage system is equivalent to the foregoing independent programmable flash chip.

Figure 4:
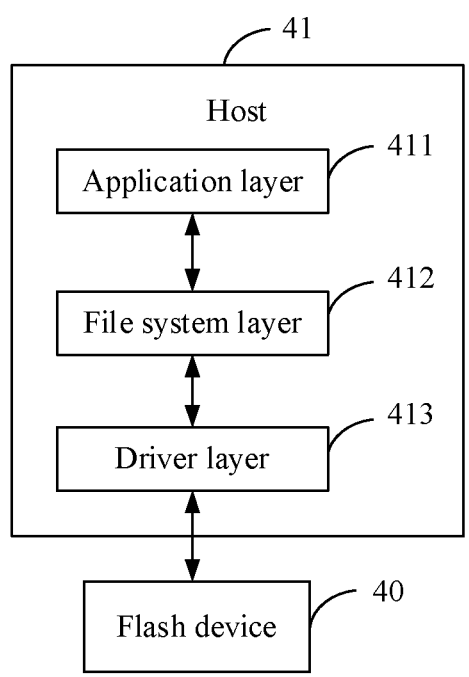
FIG. 4 is a schematic structural diagram of a communications system according to an embodiment of this application.

The data processing method provided in this application may be applicable to a communications system including a flash device and a host. As shown in FIG. 4, a communications system includes a flash device 40 and a host 41. The flash device 40 communicates with the host 41. The flash device 40 can respond to an input/output (Input/Output, IO) request delivered by the host 41, for example, return to-be-accessed data requested by a data read request or write to-be-written data that is in a data write request. The communications system shown in FIG. 4 includes a single host. In actual application, the communications system may include a plurality of hosts.

The host 41 may be a client device, for example, a computer, or may be a server. Herein, the flash device 40 and the host 41 may be independently disposed, or may be integrated into a same device. This is not specifically limited in this application.

If the flash device 40 and the host 41 are integrated into a same device, the device may be a terminal. In this case, the flash device 40 may be considered as a non-volatile memory inside the terminal, and the host 41 may be considered as a set of components other than the volatile memory inside the terminal, for example, a processor.

For ease of understanding, this application is mainly described by using an example in which the flash device 40 and the host 41 are independently disposed.

The flash device 40 and the host 41 may be connected in a wired manner, or may be connected in a wireless manner to form a remote storage system.

At least one application is installed on the host 41. Each of the at least one application is an application compatible with a system carried on the host. In a running process of any application, the host 41 may send a data write request to the flash device 40, so that the flash device 40 stores data requested by the data write request; or the host 41 may send a data read request to the flash device 40, so that the flash device 40 obtains to-be-read data and sends the to-be-read data to the host 41.

Specifically, at a software layer, the host 41 includes an application layer 411, a file system layer 412, and a driver layer 413. The application layer 411 is used to send a data write/read request to the file system layer 412 based on an actual requirement, and correspondingly, also receive a data write/read response sent by the file system layer 412. The file system layer 412 has main functions such as CPR registration, configuration, quota management, main-service providing, and exception handling. The driver layer 413 is responsible for transferring a data write request including a first identifier, constructing a device specific vendor command (Device Specific Vendor Command), and the like.

For a structure of the flash device 40, refer to FIG. 2. Details are not described herein again.

The following describes in detail the data processing method provided in this application with reference to the flash device shown in FIG. 2, the non-volatile memory shown in FIG. 3, and the communications system shown in FIG. 4.

Figure 5:
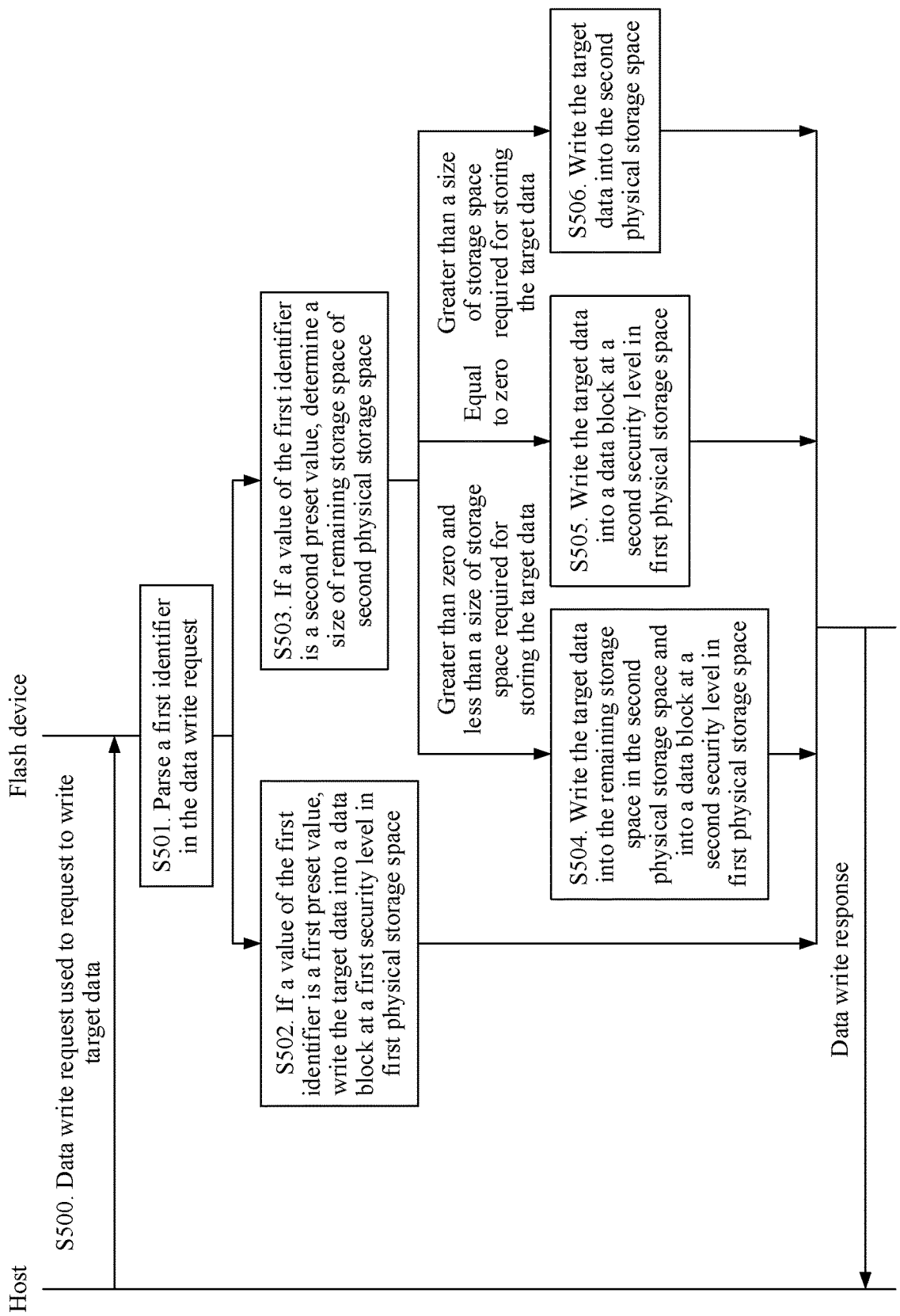
FIG. 5 is a schematic flowchart 1 of a data processing method according to an embodiment of this application.

FIG. 5 is a schematic flowchart of a data processing method according to an embodiment of this application. The data processing method may be applied to the communications system shown in FIG. 4. As shown in FIG. 5, the data processing method provided in this embodiment of this application includes the following steps.

S500. The host sends, to the flash device, a data write request used to request to write target data.

With reference to the foregoing description, it can be learned that, in a running process of an application, if the target data needs to be written into the flash device, the host generates the data write request used to request to write the target data, and sends the data write request to the flash device.

S501. After receiving the data write request, the flash device parses a first identifier in the data write request.

The first identifier is used to indicate a security level of the target data.

Optionally, if a value of the first identifier is a first preset value, the first identifier is specifically used to indicate that the security level of the target data is a first security level. If the value of the first identifier is a second preset value, the first identifier is specifically used to indicate that the security level of the target data is a second security level. The first security level is higher than the second security level.

Specifically, the flash device parses the first identifier in the data write request, and stores the target data based on the value of the first identifier. When the value of the first identifier is the first preset value, the flash device stores the target data in first physical storage space based on the first security level. Specifically, the flash device stores the target data in a data block at the first security level in the first physical storage space. When the value of the first identifier is the second preset value, the flash device stores the target data in second physical storage space and/or the first physical storage space based on the second security level. Specifically, the flash device stores the target data in a data block at the second security level in the second physical storage space and/or in a data block at the second security level in the first physical storage space. Herein, for descriptions of the first physical storage space, the second physical storage space, the data block at the first security level, and the data block at the second security level, refer to the foregoing descriptions. Details are not described herein again.

For example, if the first identifier is Security_flag, the first preset value is 1, and the second preset value is 0. The flash device parses Security_flag in the data write request. When a value of Security_flag is 1, the flash device determines that the security level of the target data is the first security level, and stores the target data into a data block at the first security level. When a value of Security_flag is 0, the flash device determines that the security level of the target data is the second level, and stores the target data in a data block at the second security level.

S502. If the value of the first identifier is the first preset value, the flash device writes the target data into a data block at the first security level in the first physical storage space.

If the value of the first identifier is the first preset value, the first identifier is specifically used to indicate that the security level of the target data is the first security level. Correspondingly, the flash device writes the target data into a data block at the first security level in the first physical storage space.

For example, for a structure of the data block at the first security level, refer to a structure of the data block A in FIG. 3.

Specifically, the flash device determines whether the first physical storage space includes an already allocated data block that is at the first security level and whose remaining storage space is greater than zero (the data block is subsequently referred to as a first data block).

If the first data block exists in the first physical storage space, the flash device determines a size of the remaining storage space of the first data block. If the size of the remaining storage space of the first data block is greater than a size of storage space required for storing the target data, the flash device writes the target data into the first data block. That is, the flash device writes the target data into the already allocated data block that is at the first security level in the first physical storage space and whose remaining storage space is larger than the storage space required for storing the target data. If the size of the remaining storage space of the first data block is less than a size of storage space required for storing the target data, the flash device writes the target data into the first data block and into a newly allocated data block at the first security level in the first physical storage space. That is, the flash device writes the target data into the already allocated data block that is at the first security level in the first physical storage space and whose remaining storage space is smaller than the storage space required for storing the target data, and into the newly allocated data block at the first security level in the first physical storage space.

If the first data block does not exist in the first physical storage space, the flash device writes the target data into a newly allocated data block at the first security level in the first physical storage space.

Optionally, before writing the target data, the flash device may further cache the target data. In addition, the flash device generates a parity data group for each strip set based on a preset CPR form and a preset CPR level, and caches the parity data group in each strip set. In this way, if an error occurs in user data in a process of writing the target data into the data block at the first security level, the flash device may restore the correct user data based on the cached parity data group and other user data in the strip set, to ensure a smooth completion of a data writing process.

It can be learned from the foregoing description that when the security level of the target data is the first security level, regardless of whether the first data block exists in the first physical storage space, the flash device writes the target data into the data block at the first security level. Because m adjacent strips in the data block at the first security level share one parity data group, the data processing method provided in this application can effectively ensure reliability of the target data, and can further effectively improve storage space utilization.

S503. If the value of the first identifier is the second preset value, the flash device determines a size of the remaining storage space of the second physical storage space.

If the value of the first identifier is the second preset value, the first identifier is specifically used to indicate that the security level of the target data is the second security level. In this case, the flash device needs to write the target data into a data block at the second security level. For descriptions of the data block at the second security level, refer to the foregoing descriptions. Details are not described herein again.

For example, a structure of the data block at the second security level is similar to a structure of a data block B in FIG. 3.

It can be learned from the foregoing description that both the first physical storage space and the second physical storage space may be used to store a data block at the second security level. When the security level of the target data is the second security level, the flash device preferably writes the target data into a data block at the second security level in the second physical storage space. Therefore, if the value of the first identifier is the second preset value, the flash device first determines the size of the remaining storage space of the second physical storage space, so that the flash device determines storage space for writing the target data.

S504. If the size of the remaining storage space of the second physical storage space is greater than zero and less than the size of the storage space required for storing the target data, the flash device writes the target data into the remaining storage space of the second physical storage space and into a data block at the second security level in the first physical storage space.

The second physical storage space is used to store only the data block at the second security level. If the size of the remaining storage space of the second physical storage space is greater than zero and less than the size of the storage space required for storing the target data, it indicates that the remaining storage space of the second physical storage space is insufficient for storing the target data. Therefore, the flash device further needs to write some of the target data into a data block at the second security level in the first physical storage space.

Optionally, the data block at the second security level in the first physical storage space herein may be an already allocated data block that is at the second security level in the first physical storage space and whose remaining storage space is greater than zero, or may be a newly allocated data block at the second security level in the first physical storage space, or may be an already allocated data block that is at the second security level in the first physical storage space and whose remaining storage space is greater than zero, and a newly allocated data block at the second security level in the first physical storage space. This is not specifically limited in this embodiment of this application.

S505. If the size of the remaining storage space of the second physical storage space is zero, the flash device writes the target data into a data block at the second security level in the first physical storage space.

Herein, the data block at the second security level in the first physical storage space is the same as the data block at the second security level in the first physical storage space in S504. Details are not described herein again.

Specially, in actual application, in a scenario in which the security level of the target data is the second security level and the size of the remaining storage space of the second physical storage space is less than the size of the storage space required for storing the target data, that is, in the scenarios described in S504 and S505, if the size of the remaining storage space of the first physical storage space is greater than a sum of sizes of available storage space with which all current applications are registered (for descriptions of the available storage space with which the applications are registered, refer to subsequent descriptions), and the first physical storage space has no available data block at the second security level but an available data block at the first security level, the flash device may write the target data into a data block at the first security level (an already allocated data block at the first security level or a newly allocated data block at the first security level). In this case, parity data in a strip set storing the target data may be junk data. In this way, effective writing of the target data can be ensured, and consistency of a data block structure in the first physical storage space can be ensured, thereby simplifying processing logic of the flash device.

S506. If the remaining storage space of the second physical storage space is larger than the storage space required for storing the target data, the flash device writes the target data into the second physical storage space.

Specifically, if the remaining storage space of the second physical storage space is larger than the storage space required for storing the target data, the flash device directly writes the target data into a data block at the second security level in the second physical storage space.

Optionally, the data block at the second security level in the second physical storage space herein may be an already allocated data block that is at the second security level in the second physical storage space and whose remaining storage space is greater than zero, or may be a newly allocated data block at the second security level in the second physical storage space, or may be an already allocated data block that is at the second security level in the second physical storage space and whose remaining storage space is greater than zero, and a newly allocated data block at the second security level in the second physical storage space. This is not specifically limited in this embodiment of this application.

It can be learned from the descriptions of S503 to S506 that if the security level of the target data is the second security level, the flash device writes the target data into the data block at the second security level. Because the data block at the second security level is used to store user data only, not parity data group, data storage space utilization is relatively high. Although reliability of the target data cannot be effectively ensured because the parity data group is not stored in the data block at the second security level, reduction of reliability of the target data is tolerable because the second security level is lower than the first security level.

Subsequently, after writing all the target data, the flash device sends a data write response to the host, to notify the host that the target data is already stored. After storing the target data, the flash device stores a correspondence between a physical block address (Physics Block Address, PBA) corresponding to the target data and a logical block address (Logical Block Address, LBA) corresponding to the target data. Therefore, after receiving the data read request sent by the host, the flash device determines, based on the correspondence, the PBA corresponding to the LBA in the data read request, and then reads the data based on the determined PBA.

Figure 6A:
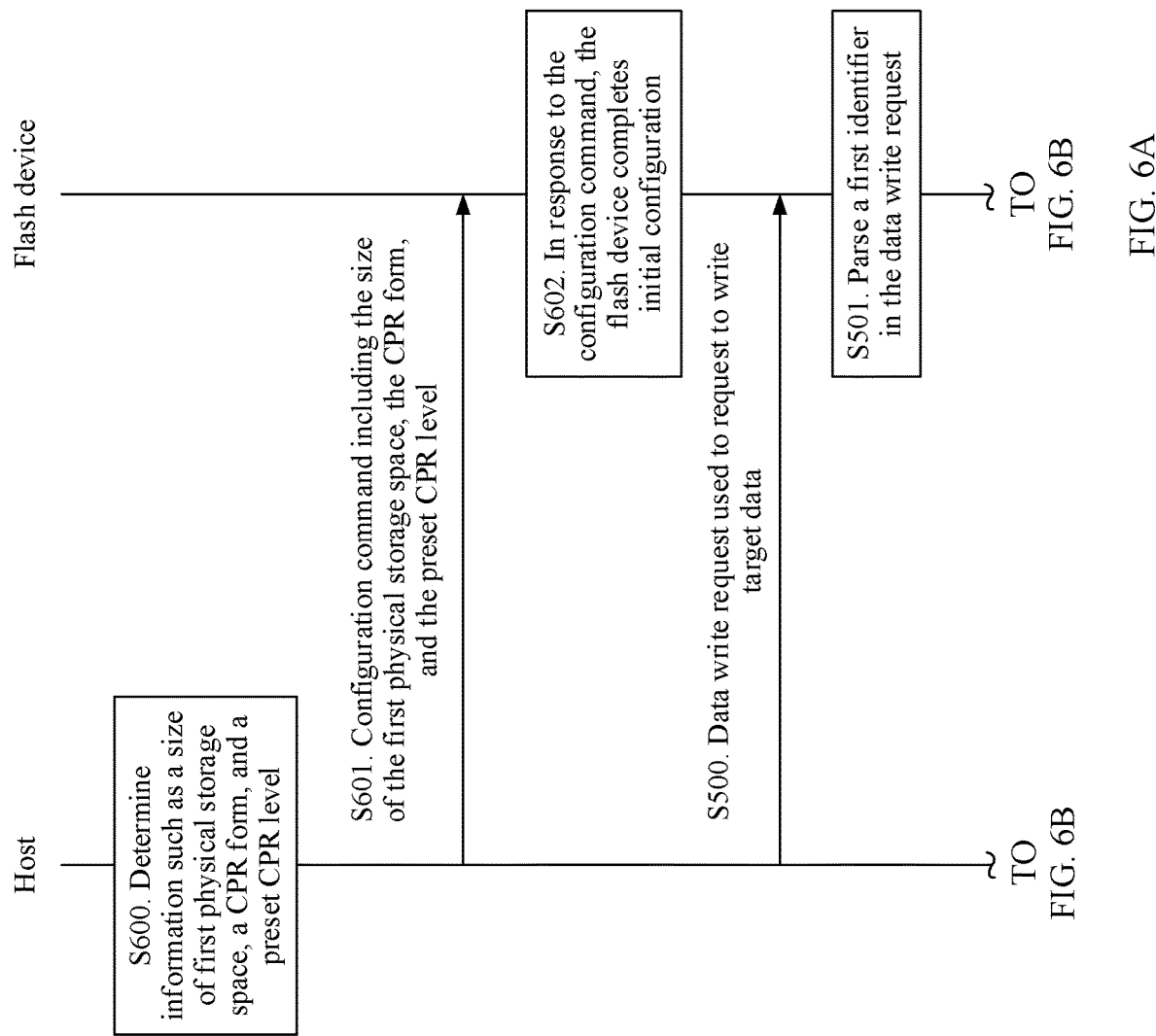
FIG. 6A and FIG. 6B are a schematic flowchart 2 of a data processing method according to an embodiment of this application.
Figure 6B:
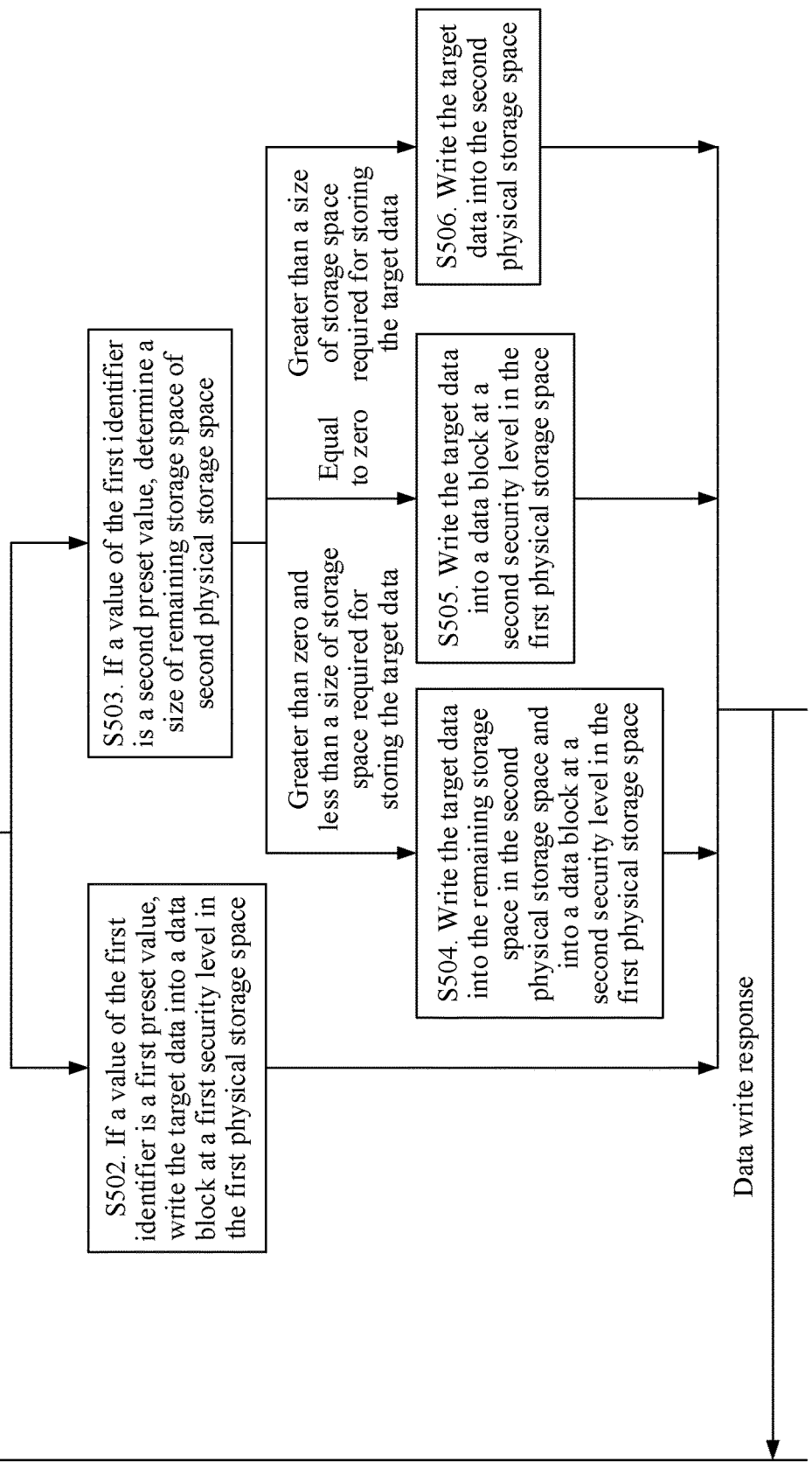

Further, at delivery or during factory resetting, both the host and the flash device may complete initial configuration. With reference to FIG. 5, as shown in FIG. 6A and FIG. 6B, before S500, the data processing method provided in this embodiment of this application further includes the following steps.

S600. The host determines information such as a size of first physical storage space, a CPR form, and a preset CPR level.

S601. The host sends, to the flash device, a configuration command including the size of the first physical storage space, the CPR form, and the preset CPR level.

S602. In response to the configuration command, the flash device completes initial configuration.

Specifically, in response to the configuration command, the flash device reserves the first physical storage space based on the size of the first physical storage space. In a subsequent running process, the flash device allocates a data block from the first physical storage space based on a requirement, to store data.

Optionally, after the host and the flash device complete initial configuration, the host in this embodiment of this application may further dynamically reserve available storage space in the first physical storage space for each of the at least one application. In this way, each application can occupy a specific part of the first physical storage space, thereby effectively balancing storage resource usage of all the applications. Specifically, in a running process of an application, a processor that runs the application sends a registration request to a storage space management module in the host, to request to allocate available storage space in the first physical storage space. After determining to accept the registration request, the storage space management module reserves a size of the available storage space in the first physical storage space for the application, and sends the size of the available storage space to the processor running the application.

The available storage space with which each application is registered is maximum storage space occupied by the application for storing data at a first security level in the flash device. It can be learned from the foregoing description that the first physical storage space is maximum storage space that is in the flash device and that is used to store data at the first security level. In actual application, a size of the available storage space with which each application is registered is less than the size of the first physical storage space.

In addition, in actual application, a sum of sizes of available storage space with which all applications are registered is less than or equal to the size of the first physical storage space.

The data processing method shown in FIG. 5 is described by using an example in which an application in a host requests to write target data in a running process. Therefore, a process in which the flash device writes the target data into the first physical storage space in FIG. 5 essentially means that the flash device writes the target data into the first physical storage space based on a size of available storage space of the application in the first physical storage space.

It can be learned from the embodiment shown in FIG. 5 that, in response to the data write request, the flash device may write the target data into a data block at the first security level or a data block at the second security level. Correspondingly, in this embodiment of this application, the flash device may also read target data in response to a data read request sent by the host, and check, by using a preset error checking and correcting (Error Correcting Code, ECC) algorithm, whether the read target data includes erroneous data. In this way, after the flash device determines that the read target data does not include erroneous data, the flash device sends the target data to the host.

Figure 7:
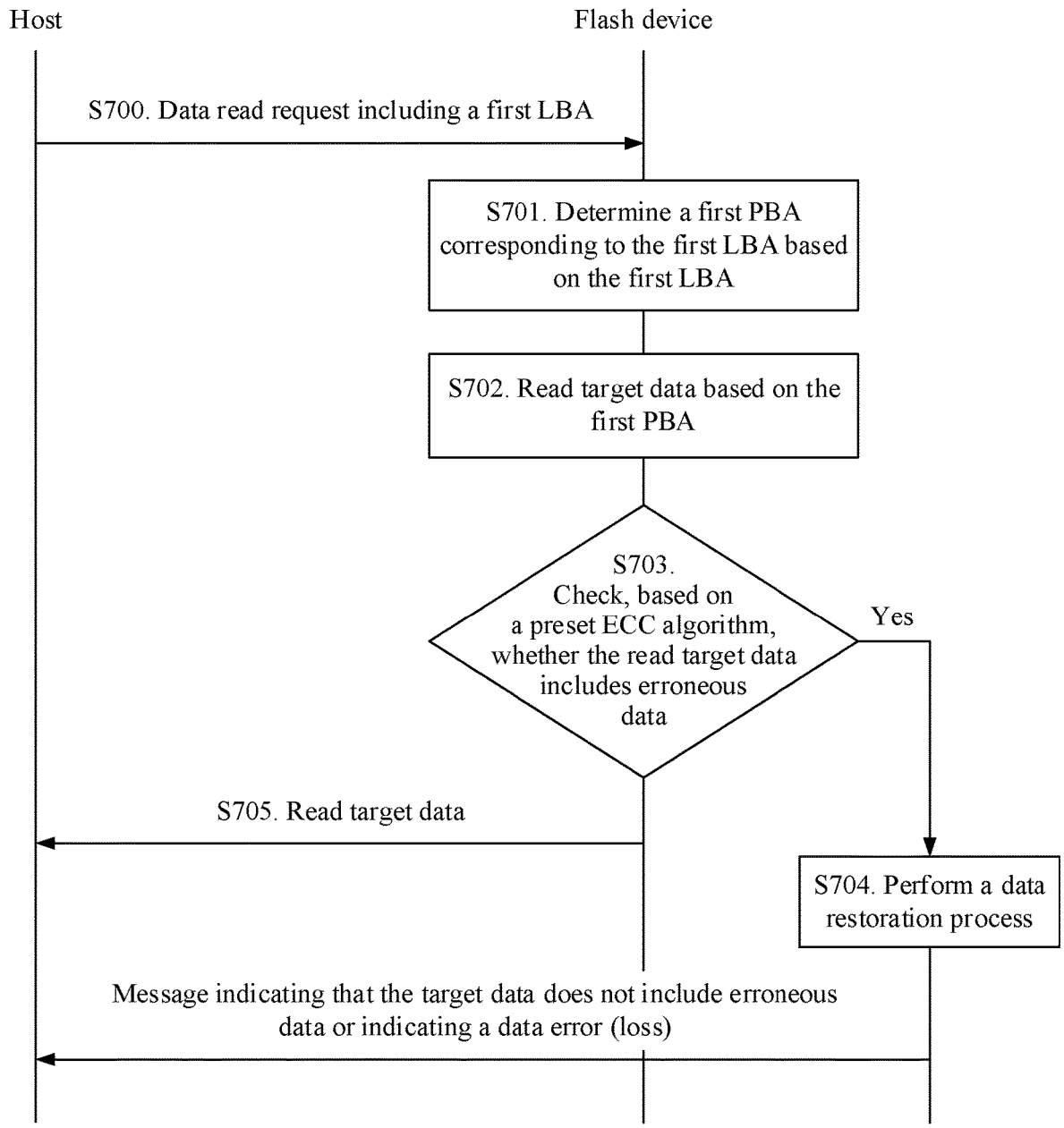
FIG. 7 is a schematic flowchart 3 of a data processing method according to an embodiment of this application.

Specifically, as shown in FIG. 7, the data processing method provided in this embodiment of this application includes the following steps.

S700. A host sends a data read request including a first LBA to a flash device.

S701. In response to the data read request, the flash device determines, based on the first LBA, a first PBA corresponding to the first LBA.

S702. The flash device reads target data based on the first PBA.

S703. The flash device checks, based on a preset ECC algorithm, whether the read target data includes erroneous data.

S704. If the target data read by the flash device includes erroneous data, the flash device performs a data restoration process.

Specifically, if the first PBA is an address of a data block at a first security level, the flash device reads a parity data group in a strip set to which the read target data belongs and other user data in the strip set, to restore from the current erroneous data. Correspondingly, after the flash device restores from the current erroneous data, the flash device sends, to the host, the target data in which no erroneous data exists.

It is easily understood that each strip set in the data block at the first security level includes one parity data group, and parity data in the parity data group is used for data restoration. Therefore, after the flash device determines that the read target data includes erroneous data, the flash device may restore from the currently erroneous data by using the parity data group in the strip set to which the read target data belongs and other user data.

If the first PBA is an address of a data block at a second security level, the flash device determines that the data is erroneous or lost and cannot be restored. Correspondingly, the flash device sends, to the host, a message used to indicate a data error or a data loss.

It is easily understood that, because the data block at the second security level is used to store user data only, not parity data, when the target data belongs to the data block at the second security level, the flash device cannot restore the data.

S705. If the target data read by the flash device does not include erroneous data, the flash device sends the read target data to the host.

In addition, the data processing method provided in this embodiment of this application may be further applied to a terminal. In this way, components in the terminal interact with each other, to write or read target data. In this scenario, the flash device in FIG. 5, FIG. 6A and FIG. 6B, or FIG. 7 may be considered as a non-volatile memory in the terminal, and the host may be considered as a set of components other than the non-volatile memory in the terminal. The flash device and the host are integrated into a same device, and the device is a terminal.

For an interaction process of components inside the terminal, refer to FIG. 5, FIG. 6A and FIG. 6B, or FIG. 7. Details are not described herein again.

In conclusion, the data processing method provided in this embodiment of this application can effectively improve storage space utilization and ensure data reliability to some extent.

An embodiment of this application provides a flash device. The flash device is used to perform steps performed by the flash device in the foregoing data processing method. The flash device provided in this embodiment of this application may include modules corresponding to the related steps.

In the embodiments of this application, the flash device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. In this embodiment of this application, module division is an example, and is merely logical function division. During actual implementation, another division manner may be used.

Figure 8:
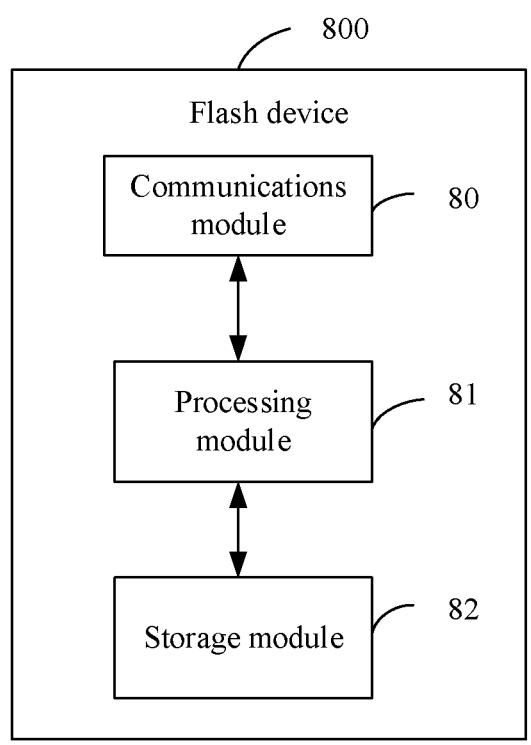
FIG. 8 is a schematic structural diagram of a flash device according to an embodiment of this application.

When each function module is obtained through division based on each corresponding function, FIG. 8 is a possible schematic structural diagram of the flash device in the foregoing embodiments. As shown in FIG. 8, a flash device 800 includes a communications module 80, a processing module 81, and a storage module 82.

The communications module 80 is configured to support the flash device 800 in performing S500, S601, S700, and S705, and/or another process of the technology described in this specification.

The processing module 81 is configured to support the flash device 800 in performing S501, S502, S503, S504, S505, S506, S602, S701, S702, S703, and S704 in the foregoing embodiments, and/or another process of the technology described in this specification.

The storage module 82 is configured to store program code and data of the flash device.

It should be noted that all related content of the steps in the foregoing method embodiments may be cited in function descriptions of corresponding function modules, and details are not described herein again.

An embodiment of this application further provides a computer-readable storage medium. The computer-readable storage medium stores an instruction. When the instruction runs on a flash device, the flash device is enabled to perform the steps performed by the flash device in the method procedure shown in the foregoing data writing method embodiments.

An embodiment of this application provides a terminal. The terminal includes a flash device and a processor, and interaction between the flash device and the processor implements the foregoing data processing method. If the flash device 40 and the host 41 shown in FIG. 4 are integrated into a same device, the device may be a terminal.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data processing method, applied to a flash device whose non-volatile memory comprises x independent programmable flash chips, wherein first physical storage space of the flash device is used to store a data block at a first security level and a data block at a second security level, the data block at the first security level comprises the x independent programmable flash chips in a preset customizable partial redundant array of independent NAND (CPR) form at a preset CPR level, the data block at the first security level comprises at least one strip set, the strip set comprises m adjacent strips, the strip set comprises one parity data group, parity data groups in different strip sets are located in different independent programmable flash chips, the preset CPR form is used to indicate that the m adjacent strips comprise one parity data group, the data block at the second security level is used to store user data only, second physical storage space of the flash device is used to store the data block at the second security level, the first security level is higher than the second security level, x is an integer greater than or equal to 1, and m is an integer greater than or equal to 2; and the data processing method comprises:

receiving a configuration command from a host, wherein the configuration command comprises a size of the first physical storage space, the CPR form, and the preset CPR level; and completing an initial configuration in response to the configuration command;

receiving a data write request, wherein the data write request is used to request to write target data;

obtaining a security level of the target data based on the data write request;

writing the target data into the first physical storage space if the security level of the target data is the first security level; and writing the target data into the second physical storage space or writing the target data into the second physical storage space and the first physical storage space if the security level of the target data is the second security level.

2. The data processing method according to claim 1, wherein the data write request comprises a first identifier used to indicate the security level of the target data.

3. The data processing method according to claim 2, wherein if a value of the first identifier is a first preset value, the first identifier is specifically used to indicate that the security level of the target data is the first security level; and the writing the target data into the first physical storage space if the security level of the target data is the first security level comprises:

writing the target data into an already allocated data block that is at the first security level in the first physical storage space and whose remaining storage space is larger than storage space required for storing the target data;

writing the target data into a newly allocated data block at the first security level in the first physical storage space; or writing the target data into an already allocated data block that is at the first security level in the first physical storage space and whose remaining storage space is smaller than storage space required for storing the target data, and into a newly allocated data block at the first security level in the first physical storage space.

4. The data processing method according to claim 2, wherein if a value of the first identifier is a second preset value, the first identifier is used to indicate that the security level of the target data is the second security level; and the writing the target data into the second physical storage space or writing the target data into the second physical storage space and the first physical storage space if the security level of the target data is the second security level specifically comprises:

determining a size of a remaining storage space of the second physical storage space; and if the size of the remaining storage space of the second physical storage space is greater than a size of a storage space required for storing the target data, writing the target data into the second physical storage space; or if the size of the remaining storage space of the second physical storage space is greater than zero and less than the size of the storage space required for storing the target data, writing the target data into the remaining storage space of the second physical storage space and into a data block at the second security level in the first physical storage space; or if the size of the remaining storage space of the second physical storage space is equal to zero, writing the target data into a data block at the second security level in the first physical storage space.

5. The data processing method according to claim 1, wherein the m adjacent strips belong to different physical pages.

6. A data processing method, applied to a flash device whose non-volatile memory comprises x independent programmable flash chips, wherein x is an integer greater than or equal to 1, wherein first physical storage space of the flash device is used to store a data block at a first security level, the data block at the first security level comprises x independent programmable flash chips in a preset customizable partial redundant array of independent NAND (CPR) form at a preset CPR level, the data block at the first security level comprises at least one strip set, the strip set comprises m adjacent strips, the strip set comprises one parity data group, parity data groups of different strip sets are located in different independent programmable flash chips, the preset CPR form is used to indicate that the m adjacent strips comprise one parity data group, and m is an integer greater than or equal to 2; and if the value of the first identifier is a first preset value, the first identifier is used to indicate that the security level of the target data is the first security level, and the data processing method comprises:

receiving a configuration command from a host, wherein the configuration command comprises a size of the first physical storage space, the CPR form, and the preset CPR level; and completing an initial configuration in response to the configuration command;

receiving a data write request comprising a first identifier, wherein the data write request is used to request to write target data, and the first identifier is used to indicate a security level of the target data; and dynamically allocating a storage space to the target data based on the security level of the target data that is indicated by the first identifier, and writing the target data into the allocated storage space.

7. The data processing method according to claim 6, wherein the dynamically allocating a storage space to the target data based on the security level of the target data that is indicated by the first identifier, and writing the target data into the allocated storage space comprises:

writing the target data into an already allocated data block that is at the first security level in the first physical storage space and whose remaining storage space is larger than storage space required for storing the target data;

writing the target data into a newly allocated data block at the first security level in the first physical storage space; or writing the target data into an already allocated data block that is at the first security level in the first physical storage space and whose remaining storage space is smaller than a storage space required for storing the target data, and into a newly allocated data block at the first security level in the first physical storage space.

8. The data processing method according to claim 7, wherein second physical storage space of the flash device is used to store a data block at a second security level, the data block at the second security level is used to store user data only, the first physical storage space is further used to store the data block at the second security level, and the second security level is lower than the first security level; and if a value of the first identifier is a second preset value, the first identifier is used to indicate that the security level of the target data is the second security level; and the dynamically allocating a storage space to the target data based on the security level of the target data that is indicated by the first identifier, and writing the target data into the allocated storage space comprises:

determining a size of a remaining storage space of the second physical storage space; and if the size of the remaining storage space of the second physical storage space is greater than a size of a storage space required for storing the target data, writing the target data into the second physical storage space; or if the size of the remaining storage space of the second physical storage space is greater than zero and less than the size of the storage space required for storing the target data, writing the target data into the remaining storage space of the second physical storage space and into a data block at the second security level in the first physical storage space; or if the size of the remaining storage space of the second physical storage space is equal to zero, writing the target data into a data block at the second security level in the first physical storage space.

9. A data processing method, applied to a terminal comprising a flash device, wherein the flash device comprises x independent programmable flash chips, x is an integer greater than or equal to 1, wherein first physical storage space of the flash device is used to store a data block at a first security level, the data block at the first security level comprises x independent programmable flash chips in a preset customizable partial redundant array of independent NAND (CPR) form at a preset CPR level, the data block at the first security level comprises at least one strip set, the strip set comprises m adjacent strips, the strip set comprises one parity data group, parity data groups of different strip sets are located in different independent programmable flash chips, the preset CPR form is used to indicate that the m adjacent strips comprise one parity data group, and m is an integer greater than or equal to 2; and if the value of the first identifier is a first preset value, the first identifier is used to indicate that the security level of the target data is the first security level and the data processing method comprises:

sending, by the processor, a configuration command to the flash device, wherein the configuration command comprises a size of the first physical storage space, and a preset customizable partial redundant array of independent NAND (CPR) form at a preset CPR level;

completing, by the flash device, an initial configuration of the first physical storage space according to the configuration command;

sending, by a processor of the terminal, a data write request comprising a first identifier to the flash device, wherein the data write request is used to request to write target data, and the first identifier is used to indicate a security level of the target data; and dynamically allocating, by the flash device, a storage space to the target data based on the security level of the target data that is indicated by the first identifier, and writing the target data into the allocated storage space.

10. The data processing method according to claim 9, wherein the dynamically allocating, by the flash device, a storage space to the target data based on the security level of the target data that is indicated by the first identifier, and writing the target data into the allocated storage space comprises:

writing, by the flash device, the target data into an already allocated data block that is at the first security level in the first physical storage space and whose remaining storage space is larger than storage space required for storing the target data;

writing, by the flash device, the target data into a newly allocated data block at the first security level in the first physical storage space; or writing, by the flash device, the target data into an already allocated data block that is at the first security level in the first physical storage space and whose remaining storage space is smaller than the storage space required for storing the target data, and into a newly allocated data block at the first security level in the first physical storage space.

11. The data processing method according to claim 10, wherein a second physical storage space of the flash device is used to store a data block at a second security level, the data block at the second security level is used to store user data only, the first physical storage space is further used to store the data block at the second security level, and the second security level is lower than the first security level; and if a value of the first identifier is a second preset value, the first identifier is used to indicate that the security level of the target data is the second security level; and the dynamically allocating, by the flash device, a storage space to the target data based on the security level of the target data that is indicated by the first identifier, and writing the target data into the allocated storage space comprises:

determining, by the flash device, a size of a remaining storage space of the second physical storage space; and writing, by the flash device, the target data into the second physical storage space if the size of the remaining storage space of the second physical storage space is greater than a size of the storage space required for storing the target data; or writing, by the flash device, the target data into the remaining storage space of the second physical storage space and into a data block at the second security level in the first physical storage space if the size of the remaining storage space of the second physical storage space is greater than zero and less than the size of the storage space required for storing the target data; or writing, by the flash device, the target data into a data block at the second security level in the first physical storage space if the size of the remaining storage space of the second physical storage space is equal to zero.

12. The data processing method according to claim 10, wherein the data processing method further comprises:

dynamically allocating, by the processor, an available storage space of the first physical storage space to each of at least one application of the terminal.

13. A flash device, comprising a storage module, a communications module, and a processing module, wherein the storage module comprises x independent programmable flash chips, first physical storage space in the storage module is used to store a data block at a first security level and a data block at a second security level, the data block at the first security level comprises x independent programmable flash chips in a preset customizable partial redundant array of independent NAND (CPR) form at a preset CPR level, the data block at the first security level comprises at least one strip set, the strip set comprises m adjacent strips, the strip set comprises one parity data group, parity data groups in different strip sets are located in different independent programmable flash chips, the preset CPR form is used to indicate that the m adjacent strips comprise one parity data group, the data block at the second security level is used to store user data only, a second physical storage space in the storage module is used to store a data block at the second security level, the first security level is higher than the second security level, x is an integer greater than or equal to 1, and m is an integer greater than or equal to 2;

wherein the communications module is configured to receive a configuration command from a host, the configuration command comprising a size of the first physical storage space, the CPR form, and the preset CPR level;

the processing module is configured to complete an initial configuration in response to the configuration command received by the communications module; and wherein the communications module is further configured to receive a data write request, and the data write request is used to request to write target data; and the processing module is further configured to: obtain a security level of the target data based on the data write request received by the communications module, write the target data into the first physical storage space of the storage module if the security level of the target data is the first security level, and write the target data into the second physical storage space of the storage module if the security level of the target data is the second security level, or write the target data into the second physical storage space and the first physical storage space of the storage module.

14. The flash device according to claim 13, wherein the data write request comprises a first identifier used to indicate a security level of the target data.

15. The flash device according to claim 14, wherein if a value of the first identifier is a first preset value, the first identifier is used to indicate that the security level of the target data is the first security level; and if the security level of the target data is the first security level, the processing module is configured to:

write the target data into an already allocated data block that is at the first security level in the first physical storage space and whose remaining storage space is larger than a storage space required for storing the target data;

write the target data into a newly allocated data block at the first security level in the first physical storage space; or write the target data into an already allocated data block that is at the first security level in the first physical storage space and whose remaining storage space is smaller than a storage space required for storing the target data, and into a newly allocated data block at the first security level in the first physical storage space.

16. The flash device according to claim 14, wherein if a value of the first identifier is a second preset value, the first identifier is used to indicate that the security level of the target data is the second security level; and if the security level of the target data is the second security level, the processing module is configured to:

determine a size of a remaining storage space of the second physical storage space; and write the target data into the second physical storage space if the size of the remaining storage space of the second physical storage space is greater than a size of storage space required for storing the target data; or write the target data into the remaining storage space of the second physical storage space and into a data block at the second security level in the first physical storage space if the size of the remaining storage space of the second physical storage space is greater than zero and less than the size of the storage space required for storing the target data; or write the target data into a data block at the second security level in the first physical storage space if the size of the remaining storage space of the second physical storage space is equal to zero.

17. The flash device according to claim 13, wherein the m adjacent strips belong to different physical pages.

* * * * *

UNITED STATES PATENT AND TRADEMARK OFFICE
CERTIFICATE OF CORRECTION

| | |
|---|---|
| PATENT NO. | : 11,593,000 B2 |
| APPLICATION NO. | : 17/262310 |
| DATED | : February 28, 2023 |
| INVENTOR(S) | : Ning Wang et al. |

It is certified that error appears in the above-identified patent and that said Letters Patent is hereby corrected as shown below:

In the Claims

In Column 25, Line 52, in Claim 3, delete "than" and insert -- than a --.

In Column 28, Line 10, in Claim 10, delete "than" and insert -- than a --.

In Column 30, Line 28, in Claim 16, delete "of" and insert -- of a --.

Signed and Sealed this
Eighteenth Day of April, 2023

Katherine Kelly Vidal
*Director of the United States Patent and Trademark Office*